United States Patent
Votoupal et al.

(10) Patent No.: US 9,729,008 B2
(45) Date of Patent: Aug. 8, 2017

(54) LIFE DEGRADATION MITIGATION FOR TRANSIENT RESPONSE ENERGY STORAGE

(71) Applicant: Caterpillar Inc., Peoria, IL (US)

(72) Inventors: John J. Votoupal, Hudson, IL (US); Dachuan Yu, Normal, IL (US); Gregory S. Hasler, Pekin, IL (US); Gregory J. Speckhart, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 623 days.

(21) Appl. No.: 14/263,233

(22) Filed: Apr. 28, 2014

(65) Prior Publication Data

US 2014/0339893 A1   Nov. 20, 2014

Related U.S. Application Data

(60) Provisional application No. 61/823,167, filed on May 14, 2013.

(51) Int. Cl.
*H02J 1/10* (2006.01)
*H02J 9/06* (2006.01)
*H02J 7/00* (2006.01)

(52) U.S. Cl.
CPC .............. *H02J 9/066* (2013.01); *H02J 7/0075* (2013.01); *Y10T 307/352* (2015.04)

(58) Field of Classification Search
CPC .......... H02P 9/04; H02P 2101/45; H02P 9/48; H02P 25/30; H02P 9/008; H02J 3/28; H02J 7/14; H02J 7/1415; H02J 3/32; H02J 3/1885; H02J 7/007; H02J 7/0075; H02J 7/022; H02J 9/08

USPC .......... 307/11, 18, 24, 29, 31–35, 38–42, 66
See application file for complete search history.

(56) References Cited

U.S. PATENT DOCUMENTS

| | | | |
|---|---|---|---|
| 5,563,802 | A | 10/1996 | Plahn et al. |
| 6,703,719 | B1 | 3/2004 | McConnell |
| 6,750,632 | B2 | 6/2004 | Votoupal |
| 2005/0063117 | A1 | 3/2005 | Amano et al. |
| 2009/0140576 | A1 | 6/2009 | Yu et al. |
| 2010/0270864 | A1 | 10/2010 | Vyas et al. |

(Continued)

FOREIGN PATENT DOCUMENTS

| | | |
|---|---|---|
| EP | 2383862 A1 | 2/2011 |
| JP | 2007-261360 A | 10/2007 |
| WO | 2012-085614 A1 | 6/2012 |

*Primary Examiner* — Lincoln Donovan
*Assistant Examiner* — Diana J Cheng
(74) *Attorney, Agent, or Firm* — Miller, Matthias & Hull (57) ABSTRACT

A variable speed genset system is provided that may include a primary power source, an electric machine, an energy storage device, a boost converter, and a controller. The electric machine may be coupled to the primary power source and electrically coupled to a load through a common bus. The boost converter may be in electrical communication with the common bus and the energy storage device. The controller may determine a State of Health (SOH) for the energy storage device, selectively engage the energy storage device to provide a first power amount to the common bus, and selectively change the operating speed of the primary power source to provide a second power amount to the common bus, the speed based on the SOH, a temperature of the energy storage device, and the load demand. The combination of the first and second power amounts substantially meet a load power demand.

20 Claims, 4 Drawing Sheets

(56) References Cited

U.S. PATENT DOCUMENTS

| | | |
|---|---|---|
| 2012/0104861 A1 | 5/2012 | Kojori et al. |
| 2012/0112754 A1 | 5/2012 | Kawai |
| 2012/0193988 A1* | 8/2012 | Eschrich ................ H02J 9/062 307/66 |
| 2012/0208672 A1 | 8/2012 | Sujan et al. |

* cited by examiner

LIFE DEGRADATION MITIGATION FOR TRANSIENT RESPONSE ENERGY STORAGE

CROSS-REFERENCE TO RELATED PATENT APPLICATION

The patent application claims the benefit of U.S. Provisional Patent Application No. 61/823,167, filed May 14, 2013.

TECHNICAL FIELD

The present disclosure generally relates to variable speed prime mover-generator sets (hereinafter "gensets"), and more particularly, to systems for controlling an electric machine of a genset during transient conditions.

BACKGROUND

Electric machines, such as induction machines, switched reluctance machines, and other comparable types of electric machines, are commonly used in the industry to convert electrical energy into rotational torque or rotational torque into electrical energy for any one of a variety of different applications including machine tools, traction motors, industrial work machines, stationary drive machines, mobile work vehicles, hybrid electric vehicles, and the like. Electric machines are commonly employed in association with a primary power source, such as an internal combustion engine or any other comparable prime mover, to provide a combined genset which serves to generate electrical and/or mechanical energy.

Figure 1:
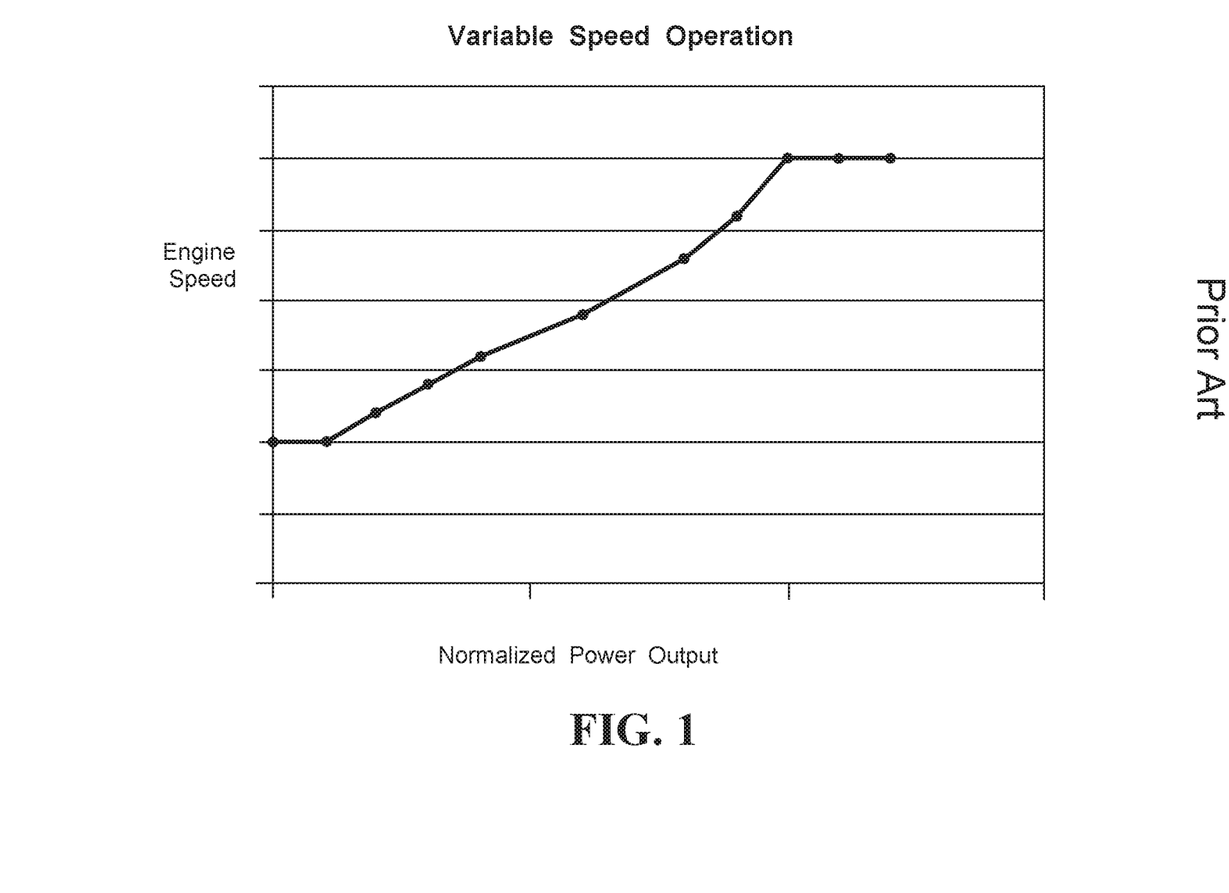
FIG. 1 is a graphical view of the normalized power output of a conventional variable speed genset as a function of engine speed.

In a variable speed genset, a primary power source is mechanically and/or rotatably coupled to a rotor of the electric machine, while the stator of the electric machine is in turn electrically coupled to a common bus of the associated vehicle, machine, or tool. The common bus generally communicates electrical power between the electric machine and one or more connected loads. In a generating mode of operation, the primary power source rotates the rotor of the electric machine to cause electromagnetic interactions which generate electrical energy to be employed by one or more of the connected loads. Moreover, in typical variable speed gensets, the operating speed of the primary power source may be varied according to the load demand, as shown, for example, in FIG. 1. For instance, in order to accommodate an increase in load demand, the engine speed can be increased to increase the electrical power produced by the electric machine. Alternately, if the load demand is reduced, the engine speed can be decreased to conserve fuel.

During transient or step load conditions when the primary power source (for example, an engine) speeds are relatively low, the power output by the genset at such low speeds may be insufficient to maintain desirable operation of each connected load. Accordingly, traditional gensets may also employ an energy storage device such as a battery, an ultracapacitor, or the like. The discharge of such an energy storage device may be converted by a nominal boost converter to substantially match the bus voltage of the common bus. The additional energy supplied by the energy storage device may then be applied to the bus voltage to assist the electric machine in supporting the connected loads. Alternatively, the speed of the primary power source may be kept artificially high in anticipation of transient or step loads. Such an arrangement may not provide optimal fuel efficiency.

U.S. Publication Number 2005/0063117, filed Nov. 5, 2004, (the '117 Application) relates to a power supply system for supplying electric power to various electrical equipment. The '117 Application describes a power supply system including a power control unit for controlling electric power supplied to a load, a battery condition sensing means for sensing the operative condition of the battery, and a load condition sensing means for sensing the operative condition of the electric load. In the power supply system, the variation of the power supply voltage at the time of the operative requirement of the electric load is estimated based on the condition of the battery and the electric load. Current supplied to electric loads is selectively limited when the estimated electric power supple voltage is smaller than a predetermined value. Although the '117 Application may describe a methodology for limiting current to loads, the '117 Application does not disclose a system or method for utilizing battery health for optimizing the speed of a power source to meet load demands.

SUMMARY OF THE DISCLOSURE

In one aspect of the present disclosure, a variable speed genset system is provided. The variable speed genset system may include a primary power source, a common bus having a bus voltage, an electric machine mechanically coupled to the primary power source, the electric machine electrically coupled to a load through the common bus, an energy storage device, a boost converter in electrical communication with each of the common bus and the energy storage device, the boost converter configured to boost a DC voltage supplied by the energy storage device into a DC voltage which approximates the DC bus voltage of the common bus, and a controller in operable communication with the primary power source, the energy storage device, and the common bus. The controller may be configured to determine a State of Health (SOH) for the energy storage device, selectively engage the energy storage device to provide a first power amount to the common bus, and selectively change the operating speed of the primary power source from a first speed to a second speed to provide a second power amount to the common bus, the second speed based on the SOH of the energy storage device, a temperature of the energy storage device, and a load power demand, wherein a combination of the first power amount and the second power amount substantially meets the load power demand.

In another aspect of the disclosure, a transient assist system is disclosed for a variable speed genset system having a primary power source, a variable speed generator, and a common bus. The transient assist system may include an energy storage device, a boost converter in electrical communication with each of the common bus and the energy storage device, the boost converter configured to boost a DC voltage supplied by the energy storage device into a DC voltage which approximates the DC bus voltage of the common bus, and a controller in operable communication with the primary power source, the energy storage device and the common bus. The controller may be configured to determine a SOH for the energy storage device, selectively engage the energy storage device to provide a first power amount to the common bus, and selectively change the operating speed of the primary power source from a first speed to a second speed to provide a second power amount to the common bus, the second speed based on the SOH of the energy storage device and a load power demand, and wherein the combination of the first power amount and the second power amount substantially meets the load power demand.

In yet another aspect of the disclosure, a method for optimizing an operating speed of a variable speed genset system is provided. The method may comprise determining a SOH and a temperature for an energy storage device, selectively engaging an energy storage device to provide a first power amount to a common bus of the variable speed genset system, selectively changing the operating speed of a primary power source of the variable speed genset system from a first speed to a second speed to provide a second power amount to the common bus. The second speed may be based on the SOH of the energy storage device, the temperature of the energy storage device, and a load power demand, where a combination of the first power amount and the second power amount substantially meets the load power demand.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts, unless otherwise specified.

Figure 2:
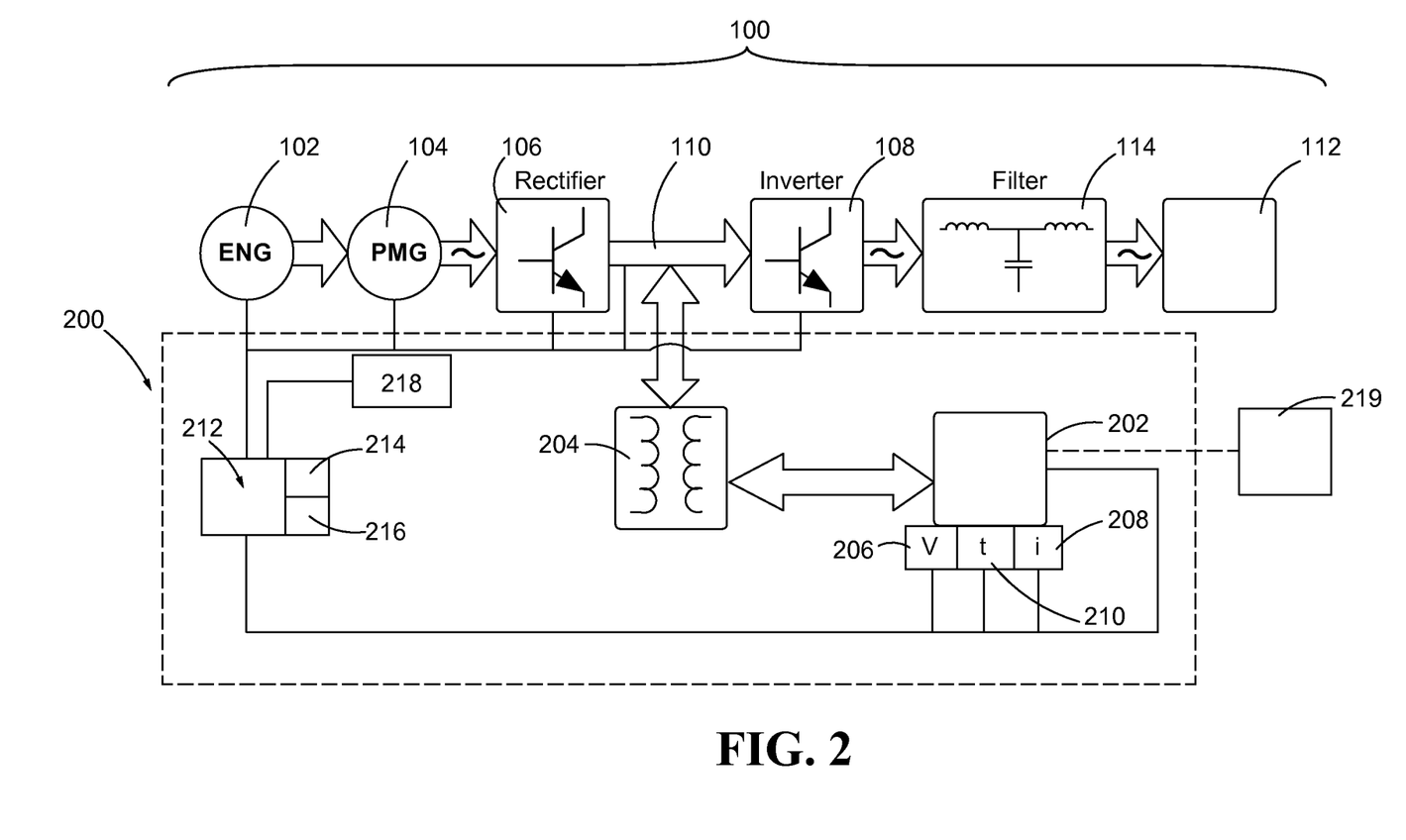
FIG. 2 is a diagrammatic view of one exemplary variable speed genset system, according to the present disclosure.

FIG. 2 diagrammatically illustrates one exemplary variable speed genset system 100 that may be employed in stationary power generation applications or in conjunction with industrial work machines, stationary drive machines, mobile work vehicles, hybrid electric vehicles, machine tools, and the like. As shown, the variable speed genset system 100 may generally include a primary power source 102, an electric machine 104, a rectifier circuit 106, an inverter circuit 108, a common bus 110 disposed between the rectifier circuit 106 and the inverter circuit 108, and one or more loads 112 associated with the variable speed genset system 100. The variable speed genset system 100 may additionally include a filter 114 for conditioning power sourced to one or more of the loads 112.

The primary power source 102 may include an internal combustion engine or any other comparable prime mover suitable for outputting mechanical energy, such as rotational torque at an output shaft thereof. The electric machine 104 may employ an induction machine, a switched reluctance machine, or any other suitable electric motor or generator known in the art. For example, the electric machine 104 may include a rotor that electromagnetically interacts with and is rotatably disposed within a stator such that, in a generating mode of operation, mechanical or rotational input at the rotor generates electrical energy at an output of the stator, or alternatively, in a motoring mode of operation, electrical input at the stator generates mechanical or rotational output at the rotor. The rotor of the electric machine 104 may be mechanically coupled to the output of the primary power source 102 and the stator may be electrically coupled to the common bus 110 through the rectifier circuit 106.

When operating in a generating mode of operation, as diagrammatically demonstrated in the variable speed genset system 100 of FIG. 2, the primary power source 102 may communicate a rotational torque at the input or rotor of the electric machine 104. As the rotor rotates within the stator of the electric machine 104, electrical power may be generated at the output of the stator and communicated to the rectifier circuit 106, which may further convert the AC voltage output by the electric machine 104 into DC voltage. The DC voltage may be communicated along the common bus 110 and to the inverter circuit 108 where the DC voltage may be converted into suitable AC voltage required by the connected loads 112. The AC voltage may further be, at least partially, conditioned by one or more appropriate filters 114 prior to sourcing the electrical power to the one or more loads 112.

During transient conditions or in the presence of step loads, the combination of the primary power source 102 and the electric machine 104 alone may be unable to immediately source adequate power to the changing loads 112 as desired. Consequently, the variable speed genset system 100 may also include a transient assist system 200.

The transient assist system 200 may comprise an energy storage device 202, a boost converter 204, a voltage meter 206, a current meter 208, a temperature sensor 210, and one or more controllers 212.

The energy storage device 202 may comprise any one or more of a battery, an ultracapacitor, or any other alternative source of energy capable of selectively supplying supplemental electrical power to the common bus 110 to assist the primary power source 102 and the electric machine 104 in meeting load demand. In some embodiments, the energy storage device 202 may be a battery that may also be utilized to provide power to the primary power source 102 during initial startup.

The boost converter 204 may be a DC to DC high boost ratio boost converter 204, or the like, configured to boost a first DC voltage, as provided by the energy storage device 202, into a second DC voltage that is significantly greater in magnitude than that of the first DC voltage and sufficient to be supplied to the common bus 110.

The voltage meter 206 may be operatively connected to the energy storage device 202 to measure the voltage level (V) of the energy storage device 202. The current meter 208 may be operatively connected to the energy storage device 202 to measure the energy storage device 202 current (I). The temperature sensor 210 may be operatively connected to the energy storage device 202 to measure the temperature (t) of the energy storage device 202.

The controller 212 may include a processor 214 and a memory component 216. The controller 212 is configured to vary the operating speed of the primary power source 102 and the connected electric machine 104 according to changes in the load power demand 404 and the State of Health (SOH) of the energy storage device 202.

The controller 212 may be operably connected to, or in operable communication with, the primary power source 102 and may be configured to monitor operating conditions of the primary power source 102 such as the operating speed. The controller 212 may be operably connected, or in operable communication with the inverter circuit 108 and configured to monitor the load power demand 404 value and changes in the load power demand 404. The controller 212 may also be operably connected, or in operable communication with, the rectifier circuit 106 and configured to monitor the bus voltage of the common bus 110. The controller 212 may also be operably connected, or in operable communication with energy storage device 202 and adapted to selectively engage the energy storage device 202 to supplement the bus voltage with an adequate DC voltage as needed. The controller 212 may also be operably connected, or in operable communication with, the voltage meter 206, the current meter 208 and the temperature sensor 210. The controller 212 may receive voltage data, V, from the voltage meter 206, current data, I, from the current meter 208, and temperature data, t, from the temperature sensor 210.

The processor 214 may be a microcontroller, a digital signal processor (DSP), an electronic control module (ECM), an electronic control unit (ECU), a microprocessor or any other suitable processor 214 as known in the art. The processor 214 may execute instructions and generate control signals for determining the State of Charge (SOC) and the SOH percentage of the energy storage device 202 and varying the speed of the primary power source 102 and the connected electric machine 104 based on, at least, the load power demand 404 and the SOH percentage. The processor 214 may execute instructions and generate control signals for determining and adjusting for the temperature limit below which the energy storage device 202 will not provide meaningful load support. Such instructions may be read into or incorporated into a computer readable medium, such as the memory component 216 or provided external to the processor 214. In alternative embodiments, hard wired circuitry may be used in place of, or in combination with, software instructions to implement a control method.

The term "computer readable medium" as used herein refers to any non-transitory medium or combination of media that participates in providing instructions to the processor 214 for execution. Such a medium may comprise all computer readable media except for a transitory, propagating signal. Common forms of computer-readable media include, for example, a floppy disk, a flexible disk, hard disk, magnetic tape, or any other magnetic medium, a CD-ROM, any other optical medium, or any other medium from which a computer processor 214 can read.

The controller 212 is not limited to one processor 214 and memory component 216. The controller 212 may be several processors 214 and memory components 216.

In one embodiment, the controller 212 may receive the operating speed of the primary power source 102, the temperature of the energy storage device 202, the lowest voltage during a discharge period, the peak current during the discharge period, and the elapsed time of the discharge. The controller 212 may also be configured to retrieve from the memory component 216 historical values for the temperature of the energy storage device 202, the lowest voltage during a discharge period, the peak current during the discharge period, and the elapsed time of the discharge, and other values necessary for the calculations discussed herein.

An output device 218 may be operably connected to, or in communication with, the controller 212. The output device 218 may include, but is not limited to, a visual display, a log, a horn, flashing lights, buzzer or the like. The controller 212 may also be configured to transmit to the output device 218 notifications, warnings, and the like, related to the SOH %, the temperature limit, and the functionality and health of the energy storage device 202.

INDUSTRIAL APPLICABILITY

Figure 3:
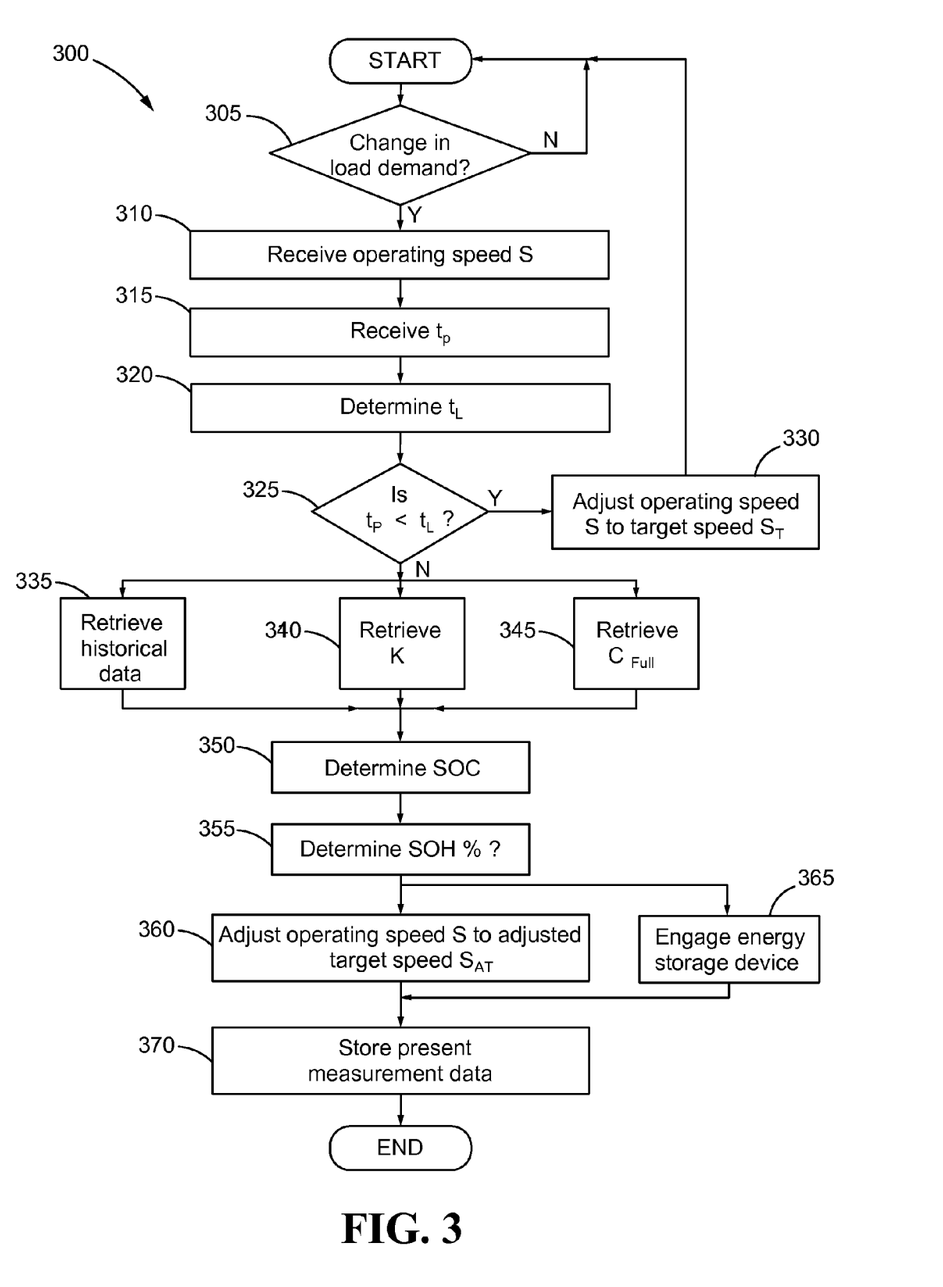
FIG. 3 is a flow diagram of one exemplary method of controlling a variable speed genset system, according to the present disclosure.

In operation, the controller 212 may be configured to operate according to a predetermined algorithm or method 300, as shown for example in FIG. 3. FIG. 3 is an exemplary flowchart 300 describing a process flow which may be followed to mitigate the effect, during the transient response of a variable speed genset system 100, of the possible degradation of the energy storage device 202. The process flow may be followed using the variable speed genset system 100 that includes the transient assist system 200, or the like.

In block 305, the controller 212 monitors the load power demand 404 as observed, for example, from the inverter circuit 108 to determine if the load power demand 404 has changed. For example, the controller 212 may determine that the load power demand 404 has increased due to a step load. The process then proceeds to block 310. In some embodiments, the controller 212 in block 305 may be configured to determine whether a minimum load is reached or exceeded. The minimum load threshold may be predetermined based on any one of a variety of different characteristics, such as the type of primary power source 102 being used, the type of electric machine 104 being used, the architecture of the variable speed genset system 100, the types of loads 112 that are supported, and the like. In an embodiment utilizing a minimum load threshold, the controller 212 may be preprogrammed to proceed to block 310 only once the load power demand 404 reaches a minimum threshold under which the benefits of adjusting the operating speed of the genset system 100 may be negligible.

For example, in one embodiment, the minimum threshold may be approximately 15% of the total rated load of the variable speed genset system 100. In another embodiment, a different minimum load threshold may be utilized under which the benefits of adjusting the operating speed of the variable speed genset system 100 may be negligible. If the load power demand 404 is determined to be less than the minimum threshold, the controller 212 may continue monitoring the load level for satisfying conditions. If, however, the minimum load threshold is met or exceeded, the controller 212 may proceed to block 310.

In block 310, the controller 212 detects or measures the actual operating speed (S) of the primary power source 102.

In block 315, the controller 212 receives from the temperature sensor 210 the present temperature ($t_P$) of the energy storage device 202.

In block 320, the controller 212 determines the temperature limit ($t_L$) below which the energy storage device 202 will not provide meaningful load support. The variable $t_L$ takes into account the magnitude of the temperature and the age of the energy storage device 202. In some embodiments, a notification or warning flag may be transmitted to an output device 218 or log when the presently calculated $t_L$ is greater than the last calculated $t_L$ due to aging of the energy storage device 202.

In block 325, the controller 212 determines whether the present temperature $t_P$ of the energy storage device 202 is less than the temperature limit $t_L$. If yes, the controller 212 proceeds to block 330 and adjusts the actual operating speed S of the primary power source 102 to the target speed ($S_T$) required by the loaded condition without assistance from the energy storage device 202.

Otherwise, the process may proceed to block 335 in which the controller 212 retrieves from memory 216 historical data related to past discharges "n" and "n−1" of the energy storage device 202. Discharge "n" is the last discharge and discharge "n−1" is the discharge prior the "n" discharge. The historical data may include the elapsed time periods of discharge $\Delta T_n$ and $\Delta T_{n-1}$. $\Delta T_n$ is the elapsed time during past discharge n, and $\Delta T_{n-1}$ is the elapsed time during discharge n−1. The historical data may further include values for voltages $V_n$ and $V_{n-1}$, and currents $I_n$ and $I_{n-1}$. $V_n$ is the lowest voltage of the energy storage device 202 during discharge time period $\Delta T_n$, and $V_{n-1}$ is the lowest voltage of the energy storage device 202 during discharge time period $\Delta T_{n-1}$. $I_n$ is the peak current supplied by the energy storage device 202 during discharge period $\Delta T_n$, and $I_{n-1}$ is the peak current supplied by the energy storage device 202 during the discharge period $\Delta T_{n-1}$. The historical data may also include temperatures $t_n$ and $t_{n-1}$ of the energy storage device 202 during respective discharge time periods $\Delta T_n$ and $\Delta T_{n-1}$.

In block 340, the controller 212 retrieves from memory 216 constant K. K is the derate scaling factor that adjusts for the estimated amount by which the theoretical charge capacity of the energy storage device 202 is diminished as a result of its discharge rate. K may be determined initially from the performance data found on the manufacturer's data sheet in conjunction with operating parameters such as the lowest acceptable charge level for the energy storage device 202. After initial determination, K may be stored in memory 216 or otherwise provided to the controller 212 for use in process 300.

In block 345, the controller 212 retrieves from memory 216, the estimated full capacity $C_{Full}$ of the energy storage device 202.

In block 350, the controller 212 determines the State of Charge (SOC) for the energy storage device 202 that was present at the beginning of each discharge, n and n−1. In general terms, the SOC is the level of charge capacity of the energy storage device 202 based on the estimated changes in the charge capacity over the plurality of preceding time periods of discharge. SOC may be calculated as the summation of the fatigue-adjusted capacity change $\Delta C_{fa}$ for each of the preceding time periods of discharge:

$$SOC = \Sigma \Delta C_{fa}$$

$$\Delta C_{fa} = [-IV(\Delta T)(K)(100\%)]/C_{Full}$$

In the $\Delta C_{fa}$ calculation, $\Delta T$ is the length of the discharge time period, I is the peak current during $\Delta T$, and V is the lowest voltage during $\Delta T$. The controller 212 in block 350 determines $SOC_n$, the State of Charge, at the beginning or start of the "n" discharge, and determines $SOC_{n-1}$, the State of Charge, that was present at the beginning or start of the "n−1" discharge.

In block 355, the controller 212 determines the State of Health percentage, SOH %, of the energy storage device 202. In one embodiment, the following algorithm or equation may be solved to determine the SOH %:

$$SOH\% = 1 - \{[(V_{(n-1)}t_{(n-1)})/(\Delta T_{(n-1)}I_{(n-1)}SOC_{(n-1)})] - [V_n t_n /(\Delta T_n I_n SOC_n)]\}K$$

Figure 4:
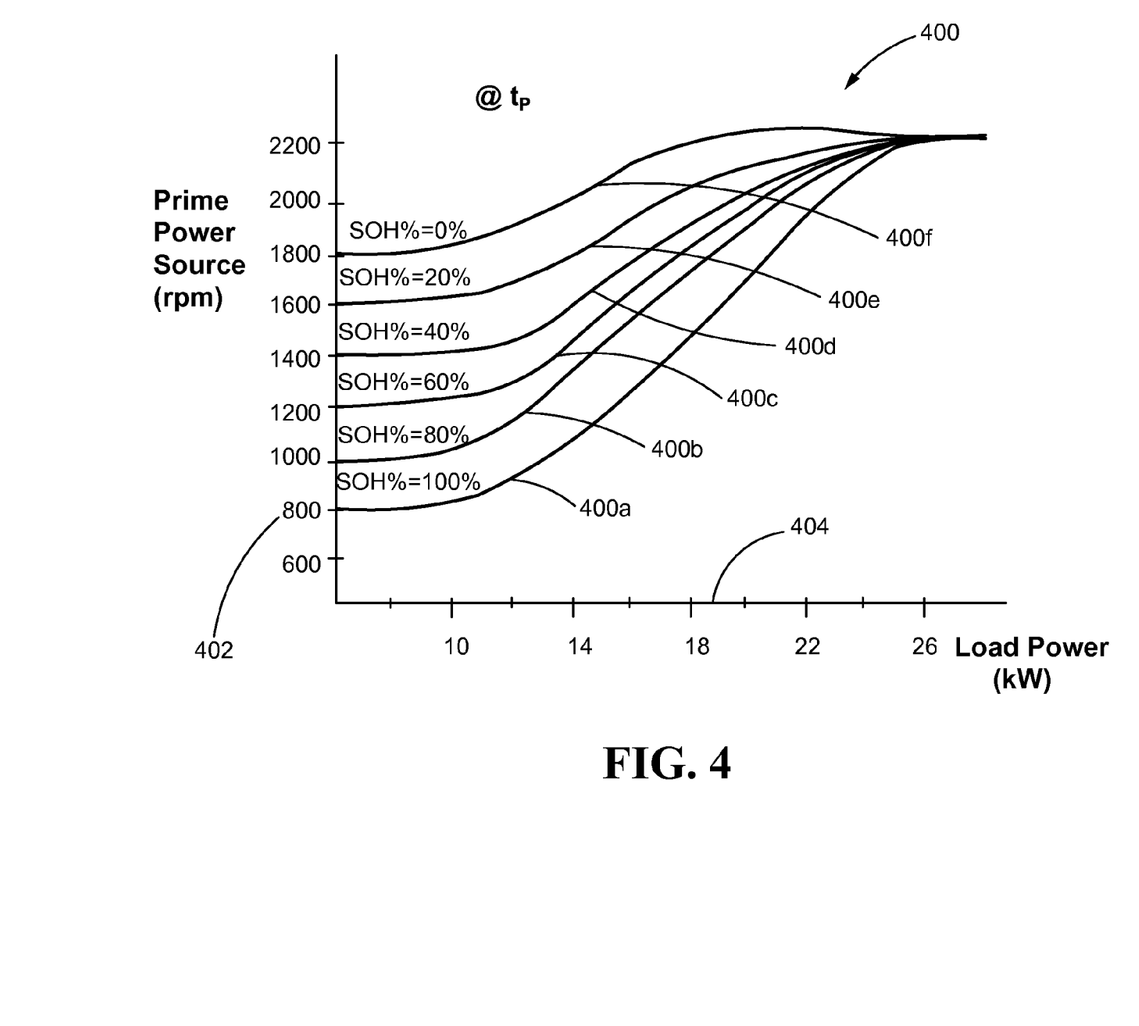
FIG. 4 is a graphical view of an exemplary set of power-speed relationships as adjusted for the health of a primary power source in accordance with the present disclosure.

In block 360 the controller 212 uses a set of preprogrammed relationships 400 to adjust the speed S of the primary power source 102 to an adjusted target speed ($S_{AT}$) based on the SOH % and the load power demand 404. FIG. 4 illustrates an exemplary set of preprogrammed relationships 400, such as exemplary power-speed curves 400(a-f), retrievably stored in a memory 216 accessible to the controller 212. The power-speed curves 400(a-f) define different adjusted target operating speeds $S_{AT}$ 402 in relation to different anticipated load power demand values 404 depending on the SOH % of the energy storage device 202. Such predefined relationships 400(a-f) represent operating parameters by which the variable speed genset system 100 is likely to perform with optimum performance and efficiency.

Thus, for a given load value 404 and SOH % at a present temperature of the energy storage device 202, the controller 212 references the appropriate power-speed relationship 400 to determine the adjusted target operating speed $S_{AT}$ 402 of the primary power source 102 that is appropriate for the given load power demand 404, and then adjusts the actual operating speed S of the primary power source 102 to match or approximate the adjusted target operating speed $S_{AT}$ 402.

For example, if the SOH% of the energy storage device 202 is determined to be about 100%, the controller 212 would utilize power-speed relationship 400a to determine the adjusted target operating speed $S_{AT}$ 402 of the primary power source 102 for a given load demand 404. Whereas, if the SOH% of the energy storage device 202 is determined to be about 20%, the controller 212 would utilized power-speed relationship 400e to determine the adjusted target operating speed $S_{AT}$ 402 of the primary power source 102 for a given load demand 404 at a present temperature of the energy storage device 202. In general, the target operating speed 402 at an SOH % of zero may be the minimum speed at which the primary power source 102 meets transient requirements without assist from the energy storage device 202. In that case, the adjusted target operating speed $S_{AT}$ 402 is the same as the target speed $S_T$. For SOH % values falling in between the defined power-speed relationships, the controller 212 may interpolate to determine the adjusted target speed $S_{AT}$ 402 of the primary power source 102 for a given load demand 404.

In block 365, the controller 212 selectively engages the energy storage device 202 to provide supplemental power to the common bus 110. The combination of the power provided to the common bus 110 by the primary power source 102 operating at the adjusted target operating speed $S_{AT}$ 402 and the power provided to the common bus 110 by the energy storage device 202 is estimated to meet the load power demand 404.

In block 370, the controller 212 receives and stores for future use measurement data related to the present discharge "n+1". Such measurement data may include the elapsed time period of discharge $\Delta T_{n+1}$, voltage $V_{n+1}$, current $I_{n+1}$ and temperature $t_P$. $V_{n+1}$ is the lowest voltage of the energy storage device 202 during the discharge time period $\Delta T_{n+1}$. $I_{n+1}$ is the peak current supplied by the energy storage device 202 during the discharge period $\Delta T_{n+1}$ and $t_P$ is the temperature of the energy storage device 202 during discharge time period $\Delta T_{n+1}$.

In some embodiments, the controller 212 may also calculate the SOC at the beginning of the present discharge $SOC_{n+1}$ and the SOH $\%_{n+1}$. If the SOH $\%_{n+1}$ is at or below a predetermined threshold, the controller 212 may transmit a warning notice or flag (collectively, "flag") to an output device 218 indicating that the energy storage device 202 functionality may be degrading and may need to be checked or replaced prior to next use. The controller 212 may utilize a look up table or hash table, or other structure to determine the flag. The controller 212 may cause the output device 218 to log the flag, activate a bar graph on a display indicating the SOH % of the energy storage device 202, or otherwise notify appropriate personnel. Alternatively, or in addition to, the controller 212 may cause the output device 218 to activate auditory or visual alarms.

In general, the foregoing disclosure finds utility in various applications relating to stationary power generation and power generation for vehicles, machines and/or tools employing variable speed gensets. More specifically, the disclosed systems and methods may be used to provide more efficient control of electric machines typically used in association with electric or hybrid drive systems including machine tools, traction motors, industrial work machines, stationary drive machines, mobile work vehicles, hybrid electric vehicles, and the like.

In particular, the disclosed transient assist system 200 enables predictive maintenance of the energy storage device 202 (for example, a battery), and optimum control and performance during loading by adjusting the speed of the primary power source 102 based on the SOH percent and temperature of the energy storage device 202.

In another embodiment, in the event of a low SOC, a charging system 219 (see FIG. 2) may be utilized to bring the energy storage device 202 (for example, a battery) SOC to a higher level. To this end, SOC may be used as a filter. Discharge events with SOC values above a given value (in one embodiment, around 70%) would be put in a database. Others would be discarded. Information including but not limited to the following may be recorded: minimum energy storage device 202 voltage during an event, energy storage device 202 current corresponding to the minimum voltage, energy storage device 202 temperature during a discharge event, and length of discharge. Such information may be used to determine a temperature limit. The length of discharge for transient assist may often be on the order of a several seconds. In some embodiments, short assists, less than about ~one (1) second, may be filtered out. Data gathering during assists may also stop at about ~five (5) seconds. Once the data is gathered we may find the minimum voltage value with the corresponding current. Energy storage device 202 current may also be used as a second filter. Often energy storage device 202 events can be grouped into a few sets of average power values. The current values are grouped into these so-called "power buckets."

Once the desired data points are gathered and grouped, the last recorded voltage may be used to project, based on energy storage device 202 characterization, for what lower temperature would the energy storage device 202, in its present condition, maintain adequate voltage for the DC-DC converter to operate. With the different groups of power values, this would result in a set of energy storage device 202 temperatures, corresponding to several power levels, at which the energy storage device 202 may be expected to maintain the required voltage for the DC-DC converter to operate. These different power capabilities could be utilized with a graph, similar to FIG. 4, to determine prime power source operation at different energy storage device 202 temperatures. With these different power levels, a health condition flag, for example a "yellow," "orange," or "red" health condition flag, of the energy storage device 202 may be assigned and then communicated to operations personnel or systems. In one embodiment, the "yellow" health condition flag may reflect inefficient energy storage power at infrequently recorded low temperatures, and "red" health condition flag may reflect insufficient energy storage power at frequently recorded low temperatures. As such, in one embodiment, the method of FIG. 4 may also include determining a flag to indicate the health condition of the energy storage device 202, and displaying the flag.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A variable speed genset system, comprising:
    a primary power source;
    a common bus having a DC bus voltage;
    an electric machine mechanically coupled to the primary power source, the electric machine electrically coupled to a load through the common bus;
    an energy storage device;
    a boost converter in electrical communication with each of the common bus and the energy storage device, the boost converter configured to boost a DC voltage supplied by the energy storage device into a DC voltage which approximates the DC bus voltage of the common bus; and
    a controller in operable communication with the primary power source, the energy storage device, and the common bus, the controller configured to:
        determine a State of Health (SOH) for the energy storage device;
        selectively engage the energy storage device to provide a first power amount to the common bus; and
        selectively change an operating speed of the primary power source from a first speed to a second speed to provide a second power amount to the common bus, the second speed based on the SOH, a temperature of the energy storage device, and a load power demand, wherein a combination of the first power amount and the second power amount substantially meets the load power demand.

2. The variable speed genset system of claim 1, wherein the controller is further configured to:
    determine a State of Charge (SOC) of the energy storage device; and
    use the SOC to determine the SOH.

3. The variable speed genset system of claim 2, wherein the SOC is a summation of fatigue-adjusted capacity changes for a plurality of preceding time periods of discharge of the energy storage device.

4. The variable speed genset system of claim 1, wherein the SOH is based at least in part on a State of Charge (SOC) of the energy storage device, a lowest voltage of the energy storage device during a discharge period, a peak current supplied by the energy storage device during the discharge period, and a derate scaling factor.

5. The variable speed genset system of claim 1, wherein the second speed of the primary power source is determined from a set of power-speed curves, corresponding to the temperature of the energy storage device, that define different adjusted operating speeds of the primary power source in relation to different load power demands and the SOH of the energy storage device.

6. A method for optimizing an operating speed of a variable speed genset system, the method comprising:
    determining a State of Health (SOH) and a temperature for an energy storage device;
    selectively engaging the energy storage device to provide a first power amount to a common bus of the variable speed genset system; and
    selectively changing, by a controller, the operating speed of a primary power source of the variable speed genset system from a first speed to a second speed to provide a second power amount to the common bus, wherein the second speed is based on the SOH, the temperature of the energy storage device, and a load power demand, and wherein a combination of the first power amount and the second power amount substantially meets the load power demand.

7. The method according to claim 6, further comprising: determining a State of Charge (SOC) of the energy storage device; and using the SOC to determine the SOH.

8. The method according to claim 7, wherein the SOC is a summation of fatigue-adjusted capacity changes for a plurality of preceding time periods of discharge of the energy storage device.

9. The method according to claim 7, further comprising using a charging system to increase the SOC of the energy storage device.

10. The method according to claim 6, wherein the SOH is based at least in part on a State of Charge (SOC) of the energy storage device, a lowest voltage of the energy storage device during a discharge period, a peak current supplied by the energy storage device during the discharge period, and a derate scaling factor.

11. The method according to claim 6, wherein the SOH is a percentage (SOH %) defined by an equation $$\text{SOH \%}=1-\{[(V_{(n-1)}t_{(n-1)})/(\Delta T_{(n-1)}I_{(n-1)}\text{SOC}_{(n-1)})]-[V_n t_n/(\Delta T_n I_n \text{SOC}_n)]\}K,$$

wherein n is a last discharge of the energy storage device, n−1 is a discharge prior to the last discharge of the energy storage device, $\Delta T_n$ is an elapsed time during n, $\Delta T_{(n-1)}$ is an elapsed time during n−1, $V_{(n-1)}$ is a lowest voltage of the energy storage device during $\Delta T_{(n-1)}$, $t_{(n-1)}$ is the temperature of the energy storage device during $\Delta T_{(n-1)}$, $I_{(n-1)}$ is a peak current supplied by the energy storage device during $\Delta T_{(n-1)}$, $\text{SOC}_{(n-1)}$ is a State of Charge of the energy storage device at a start of n−1, $V_n$ is the lowest voltage of the energy storage device during $\Delta T_{(n)}$, $t_n$ is the temperature of the energy storage device during $\Delta T_{(n)}$, $I_n$ is the peak current supplied by the energy storage device during $\Delta T_{(n)}$, $\text{SOC}_n$ is the State of Charge of the energy storage device at a start of n, and K is a derate scaling factor for the energy storage device.

12. The method according to claim 6, further comprising: adjusting the operating speed of the variable speed genset system to a target speed that substantially meets the load power demand, if the temperature of the energy storage device is less than a temperature limit.

13. The method according to claim 6, wherein the second speed of the primary power source is determined from a set of power-speed curves, corresponding to the temperature of the energy storage device, that define different adjusted operating speeds of the primary power source in relation to different load power demands and the SOH of the energy storage device.

14. The method according to claim 6, further comprising displaying a flag to indicate a health condition of the energy storage device.

15. A transient assist system for a variable speed genset system having a primary power source, a variable speed generator, and a common bus, the transient assist system comprising:

an energy storage device;

a boost converter in electrical communication with each of the common bus and the energy storage device, the boost converter configured to boost a DC voltage supplied by the energy storage device into a DC voltage which approximates the DC bus voltage of the common bus; and a controller in operable communication with the primary power source, the energy storage device, and the common bus, the controller configured to:

determine a State of Health (SOH) for the energy storage device;

selectively engage the energy storage device to provide a first power amount to the common bus; and selectively change an operating speed of the primary power source from a first speed to a second speed to provide a second power amount to the common bus, the second speed based on the SOH, a temperature of the energy storage device, and a load power demand, wherein a combination of the first power amount and the second power amount substantially meets the load power demand.

16. The transient assist system of claim 15, wherein the controller is further configured to:

determine a State of Charge (SOC) of the energy storage device based on a summation of fatigue-adjusted capacity changes for a plurality of preceding time periods of discharge of the energy storage device.

17. The transient assist system of claim 15, wherein the SOH is a percentage (SOH %) defined by an equation $$\text{SOH \%}=1-\{[(V_{(n-1)}t_{(n-1)})/(\Delta T_{(n-1)}I_{(n-1)}\text{SOC}_{(n-1)})]-[V_n t_n/(\Delta T_n I_n \text{SOC}_n)]\}K,$$

wherein wherein n is a last discharge of the energy storage device, n−1 is a discharge prior to the last discharge of the energy storage device, $\Delta T_n$ is an elapsed time during n, $\Delta T_{(n-1)}$ is an elapsed time during n−1, $V_{(n-1)}$ is a lowest voltage of the energy storage device during $\Delta T_{(n-1)}$, $t_{(n-1)}$ is the temperature of the energy storage device during $\Delta T_{(n-1)}$, $I_{(n-1)}$ is a peak current supplied by the energy storage device during $\Delta T_{(n-1)}$, $\text{SOC}_{(n-1)}$ is a State of Charge of the energy storage device at a start of n−1, $V_n$ is the lowest voltage of the energy storage device during $\Delta T_{(n)}$, $t_n$ is the temperature of the energy storage device during $\Delta T_{(n)}$, $I_n$ is the peak current supplied by the energy storage device during $\Delta T_{(n)}$, $\text{SOC}_n$ is the State of Charge of the energy storage device at a start of n, and K is a derate scaling factor for the energy storage device.

18. The transient assist system of claim 17, wherein the SOH % is calculated using discharge periods that are longer than about one second.

19. The transient assist system of claim 18, wherein the SOH is based at least in part on the State of Charge (SOC) of the energy storage device, and historical data related to a plurality of past discharges of the energy storage device, the historical data collected during about a first five seconds or less of each of the plurality of past discharges used.

20. The transient assist system of claim 19, wherein the historical data includes, an elapsed time of discharge during the discharge, a lowest voltage of the energy storage device during the discharge, a peak current supplied by the energy storage device during the discharge, and the temperature of the energy storage device during the discharge.

* * * * *